UNITED STATES PATENT OFFICE.

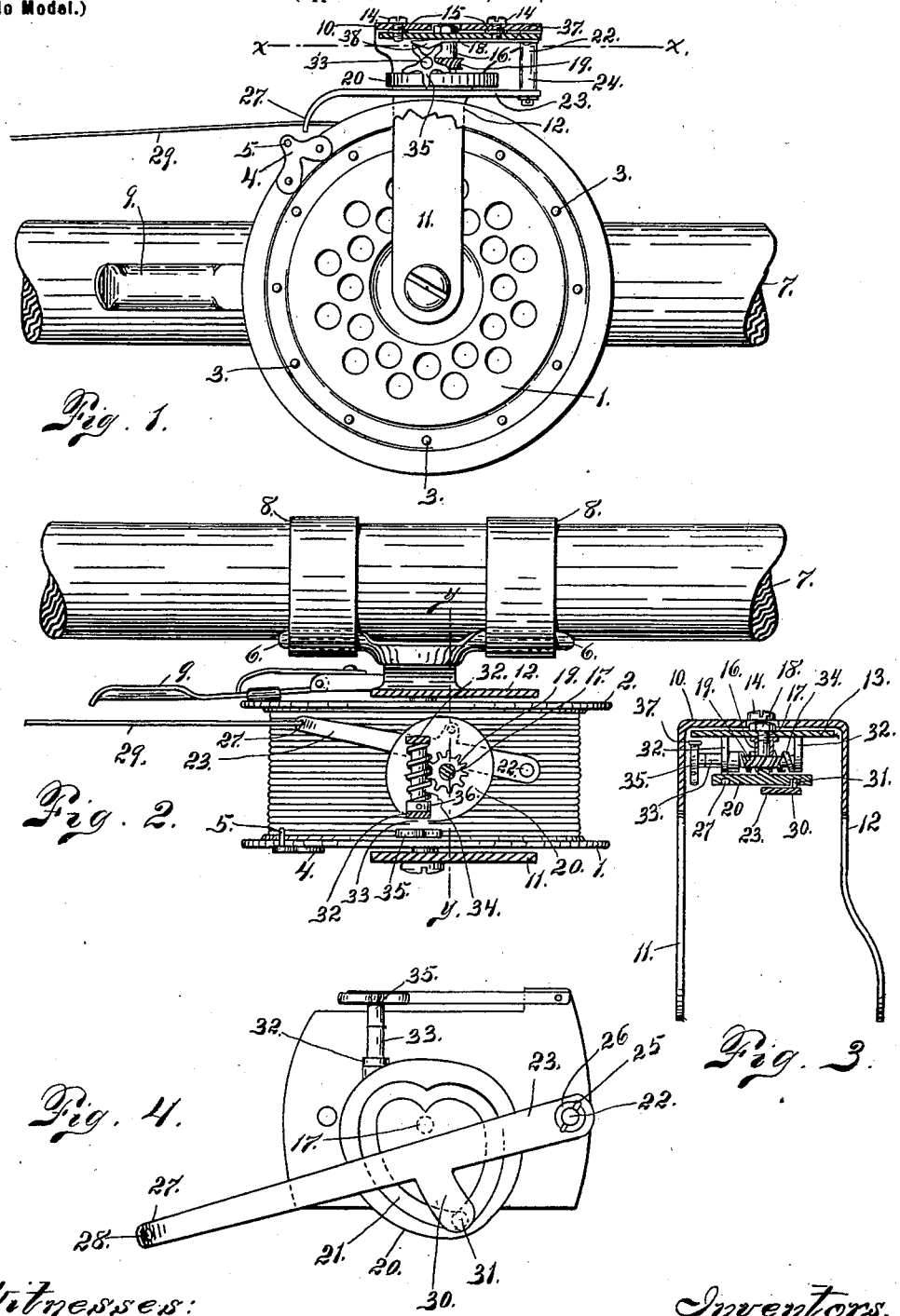

HARLOW W. BAILEY AND WILLIAM J. PARKINSON, OF BUFFALO, NEW YORK.

FISHING-REEL.

SPECIFICATION forming part of Letters Patent No. 669,249, dated March 5, 1901.

Application filed March 20, 1900. Serial No. 9,361. (No model.)

*To all whom it may concern:*

Be it known that we, HARLOW W. BAILEY and WILLIAM J. PARKINSON, citizens of the United States, residing at Buffalo, in the county of Erie and State of New York, have invented certain new and useful Improvements in Fishing-Reels; and we do hereby declare the following to be a full, clear, and exact description of the invention, such as will enable others skilled in the art to which it appertains to make and use the same, reference being had to the accompanying drawings, and to figures of reference marked thereon, which form a part of this specification.

Our invention relates to improvements in fishing-reels, and more particularly to that form of attachment which has for its object the uniform winding of the line upon the spool.

The object of our invention is to provide an attachment of this nature which can be applied to and operated with both the ordinary or windlass reel and the automatic or spring winding-reel.

To that end our invention consists of a certain arrangement and combination of parts, all of which will be fully hereinafter described and claimed.

In the drawings, Figure 1 is a side elevation of the fishing-reel, showing our improved attachment in position. Fig. 2 is a horizontal sectional view of Fig. 1, taken in the line $x$ $x$. Fig. 3 is a vertical sectional view of Fig. 2, taken in the line $y$ $y$ and in the line of sight represented by the arrow below Fig. 2; and Fig. 4 is an enlarged under side view of our improved attachment separated from its support.

Referring to the drawings, it will be seen that we have preferably shown our improvement attached to and operating with an automatic or spring winding-reel, of which 1 and 2 are the side plates, and 3 3 are a series of equidistant rods joining the two side plates inside of their peripheries and forming the spool of the reel. The spring winding apparatus located within the spool is not shown upon the periphery of the side plate 1, and in the plane of the plate is secured the holder 4, carrying the pin 5 at right angles thereto and extending inwardly a short distance from the side plate 1.

6 is the usual butt-plate, which is secured to the pole 7 by the friction-rings 8 8, and 9 is the spring-brake.

The yoke-frame which carries our improved attachment consists of the top plate 10 and the side plates 11 and 12. The lower end of the plate 12 is curved outwardly to accommodate the spring-brake, the lower ends of both plates 11 and 12 being rigidly secured to the spool-arbor, which in turn is rigid with the butt-plate 6.

13 is the plate which carries the operative parts of our improved attachment. This plate 13 is removably secured to the under side of the top plate 10 of the yoke-frame by the two screws 14 14, washer 15 being interposed between the two plates.

On the under side of plate 13 is the depending collar 16, adapted for the reception of the arbor 17, the upper end of which is held in revoluble position in the plate 13 by the nut 18. Rigid upon the arbor 17 and adjacent to the lower end of the collar 16 is the gear-wheel 19, and at the lower end of this arbor is eccentrically secured the cam-plate 20. The under side of this cam-plate 20 (see Fig. 4) has the heart-shaped cam-groove 21. Depending from the rear end of the under side of plate 10 is the shouldered post 22.

23 is the vibrating arm, having at is rear end the rigid sleeve 24, adapted for the reception of the shouldered post 22 upon the plate 13, thus forming a journal for the vibrating arm, the pin 25 and washer 26 holding the parts together.

The forward end 27 of the vibrating arm 23 is curved inwardly, as shown, and provided with the eye 28, through which the line 29 passes as it is wound upon or passes off the spool. From one side of the vibrating arm 23 extends the branch arm 30, carrying upon its outer end the upwardly-extending stud 31, adapted for travel in the heart-shaped cam-groove 21.

The stud 31 on the vibrating arm 23 and the arbor 17, upon which the eccentric plate 20 revolves, are of the same radial distance from the pivot-point of the vibrating arm.

Depending from the under side of plate 13 are the hangers 32 32, in which is journaled the arbor 33, carrying between the hangers the worm 34, which intermeshes with the gear-wheel 19 upon the arbor 17.

At the outer end of the arbor 33 is the five-toothed jump-wheel 35, rigidly secured thereto and adapted for the passing engagement of the pin 5 upon the holder 4.

The arbor 33 is held in operative position by the collar 36.

37 is a flat spring, one end of which is rigidly secured to the plate 13, its other free end carrying the triangular jump-piece 38, adapted for operative engagement with the jump-wheel 35.

The operation of the assembled parts just described is as follows: As the reel in its revolution takes up the line, the pin 5 contacts with one tooth of the jump-wheel 35 at each revolution, such tooth being held in operative position by the spring jump-piece 38. As the teeth of the jump-wheel are successively turned such intermittent motion is imparted to the worm 34, which in turn intermittently revolves the intermeshing gear-wheel 19. In this manner the eccentrically-mounted plate 20 (which, with the gear-wheel 19, is rigid upon the arbor 17) receives an intermittent rotary motion. The stud 31, traveling in the heart-shaped cam-groove 21, causes the arm 23 to travel back and forth across the width of the spool to wind the line evenly and uniformly thereon.

To insure the uniform speed of travel of the vibratory arm and its resultant even winding of the line across the spool in both directions, it will be noticed on inspection of Fig. 4 that one of the lobes of the heart-shaped cam-groove 21 is larger than the other, which configuration compensates for the circular travel of the stud 31, having as its radius the distance of the stud from the pivot-point of the vibrating arm 23.

We claim—

1. In a fishing-reel the combination with a toothed wheel and a worm mounted upon the same arbor, a gear-wheel intermeshing with the worm, and an eccentrically-mounted plate provided with a heart-shaped cam-groove, the plate and gear-wheel being mounted upon the same arbor and a pivoted vibrating arm through which the line passes provided with a stud adapted for travel in the heart-shaped cam-groove, of means connected with the revolving reel for operating the vibrating arm as and for the purpose stated.

2. In a fishing-reel the combination with a pin mounted upon one of the side plates of the reel, of a toothed wheel and a worm mounted upon the same arbor, a gear-wheel intermeshing with the worm, and an eccentrically-mounted plate provided with a heart-shaped cam-groove, the plate and gear-wheel being mounted upon the same arbor and a pivoted vibrating arm through which the line passes provided with a stud adapted for travel in the heart-shaped cam-groove as and for the purpose stated.

3. In a fishing-reel the combination with a pin mounted upon one of the side plates of the reel of a toothed wheel and a worm mounted upon the same arbor, a gear-wheel intermeshing with the worm and an eccentrically-mounted plate provided with a heart-shaped cam-groove the lobes of which are of unequal size, the plate and gear-wheel being mounted upon the same arbor and a pivoted vibrating arm through which the line passes provided with a stud adapted for travel in the heart-shaped cam-groove as and for the purpose stated.

4. In a fishing-reel the combination with a pin mounted upon one of the side plates of the reel, of a toothed jump-wheel, a spring jump-piece adapted for holding engagement with the jump-wheel, a worm mounted upon a common arbor with the jump-wheel, a gear-wheel intermeshing with the worm and an eccentrically-mounted plate provided with a heart-shaped cam-groove, the plate and gear-wheel being mounted upon the same arbor and a pivoted vibrating arm through which the line passes provided with a stud adapted for travel in the heart-shaped cam-groove as and for the purpose stated.

5. In a fishing-reel the combination with a pin mounted upon one of the side plates of the reel, of a toothed wheel and a worm mounted upon the same arbor, a gear-wheel, intermeshing with the worm and an eccentrically-mounted plate provided with a heart-shaped cam-groove, the plate and gear-wheel being mounted upon the same arbor, and a pivoted vibrating arm through which the line passes provided with a stud adapted for travel in the heart-shaped cam-groove all mounted upon a yoke-frame secured to the spool-arbor of the reel, as and for the purpose stated.

In testimony whereof we have signed our names to this specification in the presence of two subscribing witnesses.

HARLOW W. BAILEY.
WILLIAM J. PARKINSON.

Witnesses:
A. T. KRISCHEL,
W. T. MILLER.